(No Model.)
J. W. DREW.
FORK GUARD.
No. 330,824. Patented Nov. 17, 1885.
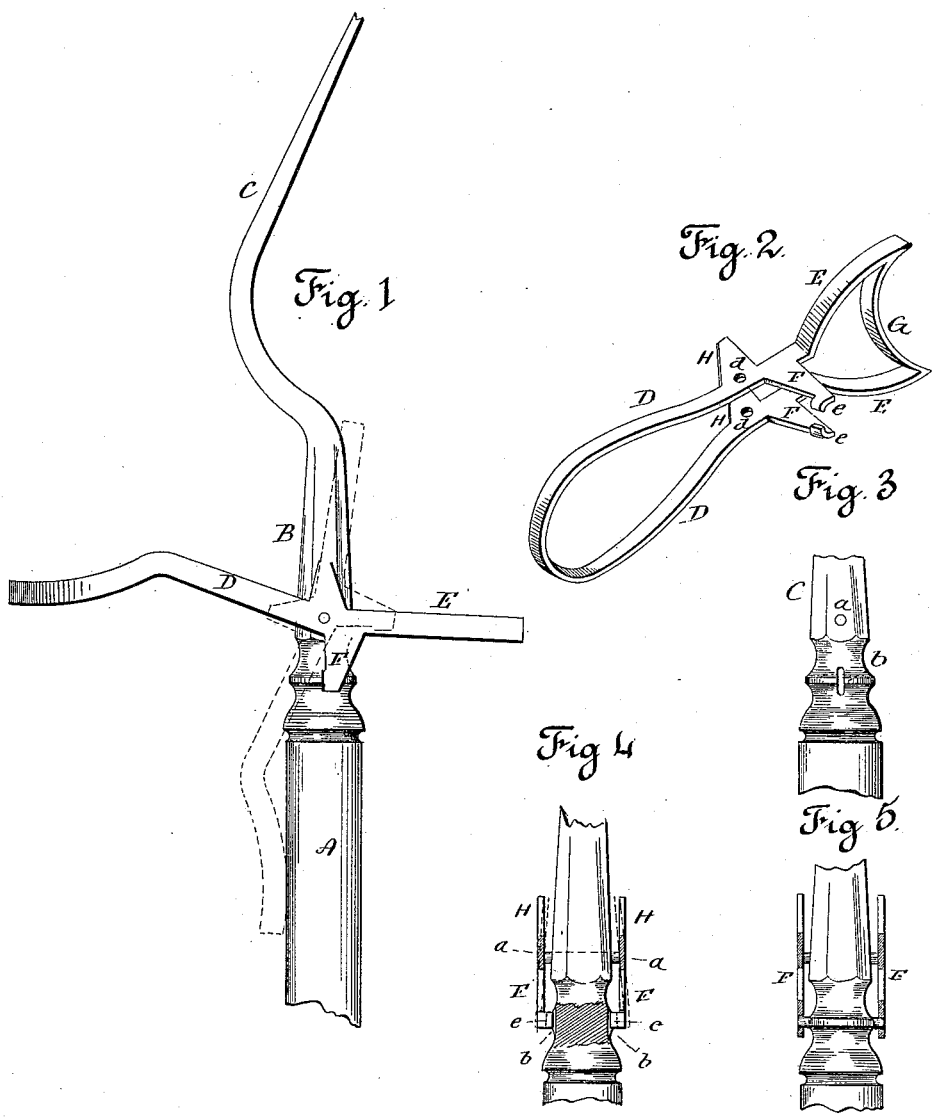
Witnesses.
J. H. Shumway
Fred C. Earle
James W. Drew.
Inventor.
By Atty.

UNITED STATES PATENT OFFICE.

JAMES W. DREW, OF NICHOLS, CONNECTICUT.

FORK-GUARD.

SPECIFICATION forming part of Letters Patent No. 330,824, dated November 17, 1885.

Application filed July 27, 1885. Serial No. 172,768. (No model.)

*To all whom it may concern:*

Be it known that I, JAMES W. DREW, of Nichols, in the county of Fairfield and State of Connecticut, have invented a new Improvement in Carving-Forks; and I do hereby declare the following, when taken in connection with accompanying drawings and the letters of reference marked thereon, to be a full, clear, and exact description of the same, and which said drawings constitute part of this specification, and represent, in—

Figure 1, a side view of the fork, showing the guard in the open position, broken lines indicating the guard in the closed position; Fig. 2, a perspective view of the guard detached; Fig. 3, a side view of the shank, showing a trunnion and corresponding notch for the interlocking of the guard; Fig. 4, a sectional top view showing the guard as in the interlocked position; Fig. 5, a modification of the interlocking device.

This invention relates to an improvement in carving-forks, with special reference to the guard which is hinged to the fork, so as to serve both as a guard and a rest to support the fork when lying upon the table. In most of the constructions of hinged guards a spring is applied to hold the guard in either its closed or raised position, and the spring generally concealed, or of such a character that after a little use and the frequent washing of the fork the spring becomes useless; or, in that class of guards where a different class of spring is employed, the guard is liable to be thrown down or turned up at inopportune times, there being no positive lock to support the guard.

The object of my invention is to construct a guard which may be readily detached or applied, and which may be firmly locked in its open position, and whereby many of the difficulties experienced in the use of hinged fork-guards are avoided; and the invention consists in the construction as hereinafter described, and particularly recited in the claims.

A represents the handle, B the shank, and C the prongs, of the fork, of usual construction. At opposite points on the shank, and preferably in a plane parallel with the prongs, a trunnion, *a*, projects, which is to form the hinge upon which the guard will turn. On the shank a cavity, *b*, is formed in one or both sides, at a short distance from said trunnions.

The guard is best made from flat or sheet metal, and is bent into loop shape to form two sides, D D, the two sides extending to form the legs E E of the rest. At the junction of the rest and guard a hole, *d*, is made in each corresponding to the trunnions *a* on the shank of the fork, and in the bending of the two legs they are brought together, so that in their normal condition they are distant from each other somewhat less than the diameter of the shank, plus the length of the trunnions, and so that the shank of the fork placed between them, the legs opened so as to permit the trunnions to come into line with the holes *d d*, then left free, the reaction will force the legs onto the trunnions, and so that the trunnions will serve as a pintle or hinge in the holes *d d*, upon which the guard may turn.

From the rear edge of each side of the guard-arms F F extend, preferably toward the handle and substantially parallel with each other. At their extreme ends they are turned inward to form inward projections *e*, to enter the recesses *b* in the shank when the guard is turned to its raised position, as seen in Fig. 4. The arms F F yield in thus turning the guard to its raised position, so that the projections readily pass over the shank until the projections come into line with the notches, and so that in such position the reaction of the spring of the arms forces the projections into the notches, so as to lock the guard in its raised or open position. The legs E E extend to the opposite side of the shank to form the rest below, as seen in Fig. 1; and I prefer to connect the two legs at their lower ends by a cross-piece, G.

To readily disengage the arms F from their locked position with the shank, I construct the guard with extensions H H upon the opposite side to the arms F, and so that placing the fingers upon the extensions H H and pressing them together, as indicated in broken lines, Fig. 4, they act as levers upon the trunnions, and so as to turn the arms F from the shank to withdraw the projections from the notches *b*, and as indicated in broken lines, Fig. 4.

The guard may be turned forward or backward to a closed position.

By simply spreading the legs so that the trunnions will escape from the holes *d* the guard may be removed whenever occasion requires—as for cleaning or for other purposes.

Instead of making the projections on the arms F and the recess in the shank, this order may be reversed, as seen in Fig. 5.

The particular location of the guard on the shank is immaterial, as it may be located anywhere between the handle and the prongs; and instead of making the arms F to extend toward the handle they may extend toward the prongs. The projections H H are desirable as a convenient means for opening the arms F; but they may be dispensed with and the arms otherwise opened to disengage them from the shank.

By making the guard and the rest from flat metal I am enabled to make it of very light metal, and to finely finish it; but the particular shape of the guard and rest is immaterial to the invention, it only being essential that it shall be of an elastic character, so as to embrace the shank and engage the trunnions.

I prefer to construct the guard with one arm F upon each side, for the reason that it gives a more finished appearance to the guard, and also forms a stronger support for the guard; but one arm may be dispensed with.

I claim—

1. The combination of a carving-fork and a guard of loop shape having the two legs D D, extending one each side the shank, and hinged to the shank, with an arm extending therefrom and adapted to interlock with the shank when the guard is turned to its upright position, substantially as described.

2. The combination of a carving-fork and a guard of loop shape having the two legs extending one each side the shank, and hinged to the shank, with an arm, F, extending therefrom, adapted to interlock with the shank when the guard is turned to its upright position, the legs also constructed with projections H H on the side of the pivot opposite the interlocking arm, substantially as and for the purpose described.

3. The combination of a carving-fork constructed with trunnions $a$ on the shank opposite each other, and a guard of loop shape, the two legs D D, adapted to extend one each side the shank, and constructed with holes $d$, corresponding to the trunnions, and adapted to spring over the trunnions, the legs also constructed with arms F, extending therefrom, adapted to interlock with the shank of the fork, and also constructed with projections H opposite the arms, substantially as described.

4. The combination of a carving-fork with a guard of loop shape, the two legs of the loop extending one each side the shank to form legs E E to serve as a rest, and also constructed with arms F, adapted to interlock with the shank, substantially as described.

5. The combination of a carving-fork with a guard of loop shape, the two legs of the loop extending one each side the shank to form legs E E to serve as a rest, and also constructed with arms F, adapted to interlock with the shank and with projections H upon the side opposite the arms F, substantially as described.

6. The combination of a carving-fork with a guard of loop shape, the two legs of the loop extending one each side the shank to form legs E E to serve as a rest, and also constructed with arms F, adapted to interlock with the shank, the two legs E E connected by a cross-piece, G, substantially as described.

JAMES W. DREW.

Witnesses:
  EDW. S. FANCHER,
  FRED. C. EARLE.